July 19, 1966 L. J. SISTI 3,261,918

SYNCHRONIZATION OF PULSE COMMUNICATION SYSTEMS

Filed Nov. 21, 1961

INVENTOR
L. J. SISTI

BY

I. V. De Simone
ATTORNEY

3,261,918
SYNCHRONIZATION OF PULSE COMMUNICATION SYSTEMS

Leo J. Sisti, Methuen, Mass., assignor to Bell Telephone Laboratories, Incorporated, New York, N.Y., a corporation of New York Filed Nov. 21, 1961, Ser. No. 153,925
2 Claims. (Cl. 179—15)

Figures 1, 2, 3:
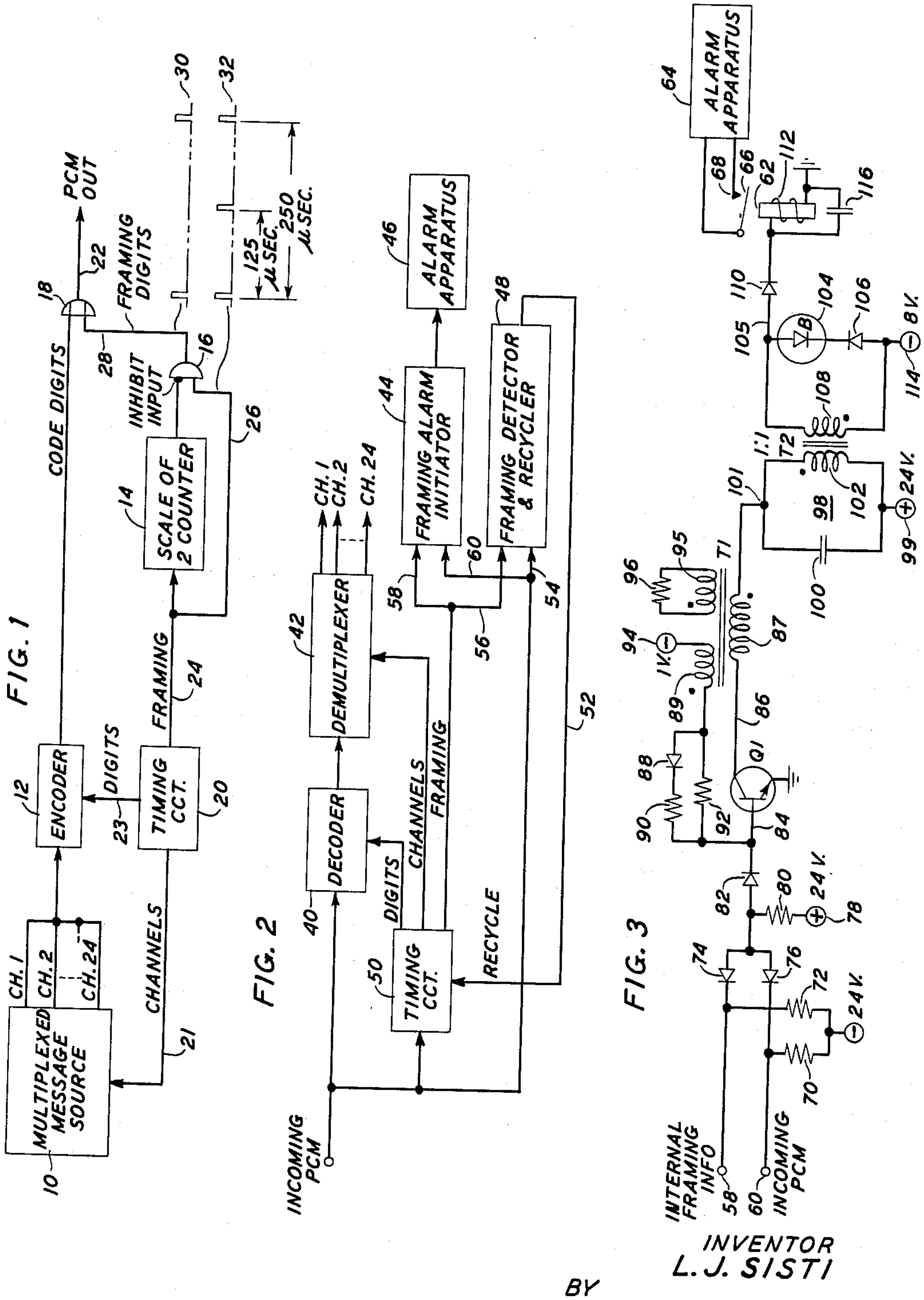

This invention relates to the synchronization of pulse communication systems and, in particular, to circuitry for initiating an alarm should such a system go out of synchronism.

Among the advantages of certain pulse communication systems is the ease with which great numbers of information channels can be multiplexed by time division in an array of periodically recurrent frames. This advantage is not without its problems. For one thing, transmitters and receivers of multiplexed pulse code must be maintained in substantially perfect phase and frequency synchronism if chaos is to be avoided. A transmitter and an associated receiver are in synchronism when they are "in frame," which simply means that each channel recurrently has exclusive use of the transmission system for a specified time during each of a succession of time intervals called frames.

Many methods of synchonizing pulse code modulation (PCM) systems have been proposed. One of these methods—the method to which the illustrative embodiment of this invention is directed—employs a so-called "winking" framing pulse. This method of synchronization is disclosed, for example, by J. G. Kreer et al. in Patent No. 2,527,638 (October 31, 1950) and by R. R. Waer in Patent No. 2,927,965 (March 8, 1960). Very briefly, the "winking" method of synchronization employs a framing pulse which recurs once every other frame. In a succession of frames the framing information takes the form of a pulse, no pulse, a pulse, etc. The framing pulse thus "winks," so to speak.

It is a principal object of this invention to make known, in a "fail-safe" manner, any failure of synchronization between the transmitter and receiver of a PCM system.

The transmitter of a PCM system must send framing information along with its code product if the receiver is to ascertain to which receiver channels the incoming code groups are to be distributed. In the receiver, an internal framing wave is generated for comparison with the PCM wave received from the transmitter. In accordance with the invention, should either or both of these waves fail, or should they be out of frame (out of synchronism), a framing alarm initiator, which is part of the receiver, will initiate an alarm. The waves are compared at the input of the alarm initiator. If they are synchronized, they trigger a pulse stretcher circuit, which very considerably increases the conduction angle of the trigger pulse. The pulse stretcher in turn excites a circuit tuned to the repetition rate of the framing pulses received from the transmitter. The sine-wave output of the tuned circuit is rectified and used to operate a relay which, when energized, as it normally is, disables the receiver's alarm apparatus. But, should system timing fail for any reason, the framing alarm initiator will cause an alarm to ensue.

The various objects and features of this invention will become more apparent after a consideration of the following discussion and the drawing to which it relates. In the drawing:

FIG. 1 is a simplified block diagram of a PCM transmitter of the type that employs a "winking" framing pulse to separate successive frames of message digits;

FIG. 2, the counterpart of FIG. 1, is a block diagram, also simplified, of a PCM receiver arranged in accordance with the invention; and FIG. 3 is a detailed schematic diagram of the framing alarm initiator of FIG. 2.

The circuits of FIGS. 1 and 2 have been simplified to emphasize the synchronizing process. Obfuscating details have thus been avoided.

FIG. 1 is a block diagram of a PCM transmitter. The transmitter comprises a multiplexed message source 10, an encoder 12, a scale of two-counter 14, an inhibit gate 16, an output OR gate 18, and a timing circuit 20.

We shall assume for the purpose of this discussion that the PCM system depicted in FIGS. 1 and 2 is one which permits the interchange of information over 24 channels. Each of these channels is allotted a sub-interval of time in each of the periodically recurrent intervals called frames. We shall also assume that each frame consists of 193 time slots, the 193rd time slot of each frame being reserved for framing information. Consequently, each of the 24 channels is allocated 8 time slots during each frame. The framing pulse pattern is a "winking" pulse, so-called, as we have seen, because pulses and spaces alternately occupy the 193rd time slot of each successive frame.

As is typical in PCM systems that transmit telephone messages, these messages are sampled at a rate of 8,000 cycles per second. The telephone message sources, the sampling mechanism, the associated filter circuits, etc. are all well known and are included in the multiplexed message source 10 of FIG. 1. These elements are disclosed, for example, in Patent No. 2,610,295, which issued to R. L. Carbrey on September 9, 1952.

Now, since the messages are sampled at a rate of 8,000 cycles per second and 193 time slots are allotted for each frame, the basic repetition rate of the system presently under discussion is 1.544 megacycles per second.

In FIG. 1 the timing circuit 20, which is the source of all timing information and may be any of a number of suitable timing devices well known in the art, comprises means for timing the occurrence of channels, digits, and framing information. It sequentially connects each of the 24 channels emanating from the multiplexed message source 10 to the encoder 12. This sequential connecting process is effected via a "channel" timing bus 21, which interconnects the timing circuit 20 and the multiplexed message source 10.

Samples from the multiplexed message source 10 are supplied to the encoder 12, where, in a manner well known (see, for example, the above-cited Carbrey patent), they are converted to a pulse code. The encoder 12 is also timed by the timing circuit 20, as is indicated by the "digits" timing bus 23, which interconnects the timing circuit 20 to the encoder 12. A code representation of the samples produced in the multiplexed message source 10 is supplied by the encoder 12 to an output OR gate 18 and, thence, to the transmission line 22.

As we have already noted, it is necessary that the transmitter of FIG. 1 and the receiver of FIG. 2 be maintained in synchronism. Accordingly, framing information must be supplied to the transmission line 22. Since each message source in the circuit 10 is sampled at a rate of 8,000 cycles per second, framing digits (pulses and spaces) must also be produced at this rate. Accordingly, the timing circuit 20, via its "framing" output 24, supplies pulses having a repetition frequency of 8,000 cycles per second to a scale-of-two counter 14, which is simply a frequency divider. These pulses also proceed to the input 26 of an inhibit gate 16. An inhibit gate, it will be recalled, passes stimuli supplied to its noninhibit input only when its inhibit input is not energized.

The scale-of-two counter 14 reduces the frequency of pulses supplied to it from 8,000 cycles per second to 4,000 cycles per second. The effect of this reduction of frequency is to delete every other pulse fed into the counter.

The pulse train thus produced is supplied to the inhibit input of the gate 16. As a consequence, the output 28 of the inhibit gate 16 consists of framing pulses recurring at a rate of 4,000 cycles per second. The rate of recurrence of the framing digits (pulse, space, pulse, etc.) is, however, 8,000 cycles per second.

The waveform 30 represents the framing pulse output of inhibit gate 16. The waveform 32 represents the framing pulse output of the timing circuit 20. The reader should note that the intervals between the pulses of these waveforms have not been fully shown. The dotted lines should therefore make clear that the width of each of these pulses is very small in relation to the period of a frame (125 microseconds).

The framing digits (pulse, space, pulse, etc.) are supplied to the OR gate 18 and thence to the transmission line 22. The output of the PCM transmitter of FIG. 1 thus comprises frames of encoded messages delineated by periodically recurrent framing digits. This PCM code is supplied to the receiver of FIG. 2.

FIG. 2 comprises a decoder 40, a demultiplexer 42, a framing alarm initiator 44, an alarm apparatus 46, a framing detector and recycler 48, and a timing circuit 50. Just as the timing circuit 20 times the operations of the various circuits of FIG. 1, the timing circuit 50 times the processes occurring in the various elements of FIG. 2.

In a manner well known (see, e.g., the above-cited Carbrey patent) the decoder 40 converts the incoming pulse code to analog signals and supplies these signals to the demultiplexer 42. The timing circuit 50, as can be seen, is essentially a slave oscillator, since it operates under the control of the incoming PCM wave. As does the timing circuit 20 of FIG. 1, the timing circuit 50 of FIG. 2 marks off 1,544,000 time slots per second and supplies this timing information to the decoder 40. It also supplies channel marking information to the demultiplexer 42 and, once every 125 microseconds (the duration of a frame), supplies a framing pulse to both the framing alarm initiator 44 and the framing detector and recycler 48. The last two receiver elements are also supplied with the incoming PCM wave.

The framing detector and recycler 48, in a manner well known (see, e.g., Patent No. 2,949,503 which issued to F. T. Andrews, Jr. et al. on August 16, 1960), sees to it that the receiver is maintained in proper channel alignment with the transmitter. The incoming PCM is continually checked for in-frame synchronization. Any framing errors that are detected are integrated to determine the density of these errors. When this density exceeds a certain level, a recycling stimulus is supplied by the framing detector and recycling circuit 48, via its output 52, to the timing circuit 50. The recycling stimulus will cause the timing circuit 50 to initiate a search for the framing digits transmitted from FIG. 1.

As we have noted, 192 of the 193 time slots of each frame are distributed equally to 24 channels. Each channel thus has the use of eight time slots during each frame. Immediately following the 23rd channel, the timing circuit 20 of FIG. 1 counts off nine time slots, the ninth one being used to house a framing digit. Thus, when the framing detector and recycler 48 of FIG. 2 has determined that the receiver is out of frame and a recycling stimulus is consequently supplied to the timing circuit 50, the timing circuit 50 will begin counting off a group of nine time slots. Since, ordinarily, groups of eight time slots are counted off, we call the count of nine a "long count." The effect of a long count is to delay internal framing digits successively by one time slot, so that the incoming PCM supplied to the input 54 of the framing detector and recycler 48 will be compared with successively delayed internal framing digits coming from the timing circuit 50. When the circuit 48 has ascertained that these internal framing digits are in synchronism with the framing digits of the incoming PCM train, the recycling process in the timing circuit 50 will cease.

It can be seen in FIG. 2 that the internal framing information is supplied not only to the input 56 of the framing detector and recycler 48, but also to the input 58 of the framing alarm initiator 44. In accordance with the invention, the framing alarm initiator 44 provides an alarm signal for the alarm apparatus 46 in the event of any timing failure—that is to say, whenever it has been ascertained that the receiver of FIG. 2 is out of synchronism with the transmitter of FIG. 1 or whenever either of the input waves supplied to it has been disrupted.

The alarm apparatus 46 may be a visible or audible alarm, one ordinarily located in a telephone central office and suitable for the purpose at hand. The alarm initiator 44 is shown in detail in FIG. 3 and will now be described.

The framing alarm initiator of FIG. 3 compares the incoming PCM wave supplied to its input 60 with the internal framing information supplied to its input 58 to ascertain whether the internal (receiver) and external (transmitter) framing digits are in synchronism. If these digits are in frame, the relay 62 will be energized, as is shown, and the alarm apparatus 64 will be disabled. Should it be ascertained that these digits are not in synchronism, then, ultimately, the relay 62 will be deactivated and the arm 66 of this relay will return to its normal rest position on the surface of the contact 68. When this contact is made, an alarm will be initiated in the alarm apparatus 64.

Illustrative values have been given the various potential sources of FIG. 3 in order to give the meaning to the processes that occur in the circuit.

The resistors 70 and 72 and the diodes 74 and 76 form an AND gate, which allows the bias current flowing from the source of potential 78, through the resistor 80, to flow through the switching diode 82 whenever an internal framing pulse (received at the input 58) and an external framing pulse (received at the input 60) appear simultaneously. The diode 82 thereupon allows turn-on current to flow into the base 84 of the transistor Q1.

The wave supplied to the input 58 is, as we have seen, the internal framing wave generated by the timing circuit 50 of FIG. 2. The wave supplied to the input 60 is the composite PCM wave received from the transmitter of FIG. 1. This wave includes the external framing wave 30 of FIG. 1, which, we have noted, has a pulse repetition rate of 4,000 cycles per second. Consequently, when the transmitter of FIG. 1 and the receiver of FIG. 2 are in synchronism, the switching diode 82 passes to the transistor Q1 a pulse train having a pulse repetition rate of 4,000 cycles per second.

The transistor Q1 and its associated elements form a blocking oscillator. Current appearing at the collector 86 of the transistor is fed back (by way of the primary winding 87 and the secondary winding 89 of the transformer T1, the diode 88, and the resistors 90 and 92) to the base 84 of the transistor. The diode 82 prevents this feedback current from flowing back into the diodes 74 and 76.

The bias source 94 clamps the resistor-diode feedback network 88, 90, 92 to a negative potential and thereby stabilizes the transistor Q1 when it is in its nonconductive state. The resistor 96, which is connected across the secondary winding 95 of the transformer T1, loads the transformer T1 and prevents oscillations in the primary winding 87 from reaching a magnitude greater than the breakdown voltage of the transistor Q1.

The transistor Q1 acts as a pulse stretcher. The trigger pulses conveyed to its base 84 by the diode switch 82 may, for example, have a duration of approximately ⅓ microsecond. At the collector 86, each of these pulses will have been transformed to a pulse having a width of approximately 40 microseconds. In this manner, the transistor Q1 provides enough power gain to insure that the power level of the sine-wave produced in the tuned circuit 98 is sufficient, after rectification, to render the relay 62 normally operative.

The tank circuit 98 comprises a capacitor 100 and the primary winding 102 of a transformer T2, which has a unity turns radio. This circuit is tuned to the pulse repetition frequency of the external framing wave 30 of FIG. 1 and, thus, to the repetition frequency of the pulses appearing at the collector 86 of the transistor Q1 when the external and internal framing waves are in synchronism. These in-frame pulses cause the tank circuit 98 to go into maximum oscillation. The circuit 98 thus, in a sense, selectively filters pulses appearing at the collector 86 of the transistor Q1.

The selectivity of the tank circuit 98 is important for, as we have noted, the external framing pulse is, except for its repetition frequency, just another one of the electrically identical pulses contained in the PCM wave supplied to the input 60 of FIG. 3. Consequently, it is conceivable—indeed, perhaps it is better to say probable—that an internal framing pulse (at input 58) may be coincident with one of the incoming message or signaling pulses at one time or another when the system of FIGS. 1 and 2 is out of frame. The transistor Q1 bears no ill will toward such a coincidence and will respond just as it would if the system were in frame. But coincidences of this sort would occur at a randomly varying rate and, to frequencies other than the external framing pulse repetition frequency, the tank circuit 98 is thoroughly discriminatory and responds ever so feebly.

Thus, we may note one feature of the invention. The circuit of FIG. 3 effectively responds only to periodically recurrent stimuli—i.e., only to in-frame products of the transistor Q1—for if either or both input waves fail, the activating current in the relay 62 will cease and an alarm will ensue; and if these waves are extant but out of synchronism, the hostile response of the tank circuit 98 will cause this current to fall below the release-current level of the relay and, again, an alarm will ensue. Since the relay 62 is normally operative, and the failure of either or both input waves or their desynchronization exhausts all framing discrepancies, the framing alarm initiator of FIG. 3 is fail-safe.

The potential source 99 biases the collector 86 of the transistor Q1. Now, since the tank circuit 98 is direct-coupled to the collector 86, the net collector bias voltage is dependent upon the A.-C. (alternating current) voltage swing across the tank circuit. A negative swing can cause this bias voltage to go negative and thus forward-bias the collector 86. Consequently, a breakdown (or Zener) diode 104 and a rectifier diode 106 are connected across the secondary winding 108 of the transformer T2 to limit the A.-C. peak-to-peak swing across the tank circuit 98. If, for example, we choose a diode 104 that saturates at 18 volts, the algebraic sum (at the juncture 101) of the potential 99 and an 18 volt negative swing of the sine-wave across the tank circuit 98 will be at a minimum of +6 volts, a voltage that assures satisfactory operation of the transistor Q1. When an in-frame condition causes the transistor Q1 to be triggered, the juncture 101 will be at this minimum voltage.

We may here note another feature of the invention. We have seen that the voltage of the juncture 101 reaches a level of +6 volts when the transistor Q1 fires in response to an in-frame stimulus from the switching diode 82. Now it is a characteristic of the pulse stretcher, of which the transistor Q1 is the active element, that the width of its output pulses is inversely proportional to its collector supply voltage. And we have seen that the tank circuit 98 responds feebly to any randomly occurring out-of-frame stimuli passed to it by the diode 82 via the transistor Q1. This feeble response means that the minimum voltage level of the juncture 101 will be considerably greater than the in-frame level of +6 volts. In other words, the out-of-frame collector bias voltage of the transistor Q1 is significantly greater than the in-frame collector bias voltage. Consequently, since the output pulse power of the transistor Q1 is inversely proportional to its collector bias voltage, maximum pulse power is available only when the system of FIGS. 1 and 2 is in frame.

The diode 110 is a rectifier and it supplies the direct current counterpart of the transistor Q1's output pulse power, after its sine-wave transformation in the tank circuit 98, to the relay 112.

The potential source 114 assures adequate operating margins for the relay 62. We want the relay to release its arm 66 when a timing failure occurs; but it must hold that arm away from the contact 68 when the system is in synchronism. We choose the voltage of the potential source 144 accordingly. If, for example, the resistance of the relay's winding 112 is 5,000 ohms, its operate current is 0.5 milliampere, and its release current is 0.3 milliampere, we might, as is shown in FIG. 3, use a voltage of −8 volts for the potential source 114.

Experiments, in which various timing failures were simulated, have shown that this voltage provides adequate relay-operating margins. When the system is in synchronism, positive peak voltages of 18 volts are produced in the secondary 108 of the transformer T2. These peaks, when set off against the −8 volt bias of the source 114, emerge from the diode 110 as direct-current pulses of about 10 volts. This pulsating direct current (the capacitor 116 smoothes it) causes the relay 62 to hold its arm 66 away from the contact 68. The input circuit of the alarm apparatus 64 is open and all is quiet.

But when a timing failure has occurred, the response of the tank circuit 98 to any out-of-frame stimuli is feeble, as we have seen. Consequently, any sine-wave so produced will have an amplitude well below that of the potential source 114, and the anode 105 of the rectifier 110 must accordingly be negative. An alarm will be given for, denied operating current, the relay 62 will release its arm 66 and the input circuit of the alarm apparatus 64 will be closed.

We have considered the invention in the context of an illustrative embodiment and, consequently, should note that other embodiments, within the spirit and scope of the invention, are feasible.

What is claimed is:

1. In a binary pulse communication system in which successive frames of a predetermined number of regularly recurring message digits each are transmitted in sequence from a transmitting terminal to a receiving terminal, in which a framing digit is transmitted once each frame in sequence with said message digits, and in which said framing digit is alternately a pulse and a space in successive frames, apparatus at said receiving terminal which comprises a timing circuit for generating an internal framing digit having the repetition frequency and alternate pulse-space pattern of said transmitted framing digit, a normally enabled alarm circuit, a two-input AND gate having one input connected to receive said transmitted message digits and framing digit and the other connected to receive said internal framing digit, and means to disable said alarm circuit only when pulses having a repetition frequency of half the repetition frequency of said transmitted framing digit appear at the output of said AND gate, whereby said alarm circuit is enabled whenever said transmitted framing digit is out of frame with said internal framing digit, whenever there is a failure of said transmitted framing digit, or whenever there is a failure of said internal framing digit.

2. In a binary pulse communication system in which successive frames of a predetermined number of regularly recurring message digits each are transmitted in sequence from a transmitting terminal to a receiving terminal, in which a framing digit is transmitted once each frame in sequence with said message digits, and in which said framing digit is alternately a pulse and a space in successive frames, apparatus at said receiving terminal which comprises a timing circuit for generating an internal framing digit having the repetition frequency and alternate pulse-space pattern of said transmitted framing digit, a normally enabled alarm circuit, a two-input AND gate having one input connected to receive said transmitted message digits and framing digit and the other connected to receive said internal framing digit, a blocking oscillator having an output tank circuit tuned to half the repetition frequency of said transmitted framing digit connected to receive pulses from the output of said AND gate and regenerate with increased power content only those occurring at the repetition frequency to which said tank circuit is tuned, and means to disable said alarm circuit only in response to a succession of pulses regenerated by said blocking oscillator, whereby said alarm circuit is enabled whenever said transmitted framing digit is out of frame with said internal framing digit, whenever there is a failure of said transmitted framing digit, or whenever there is a failure of said internal framing digit.

References Cited by the Examiner

UNITED STATES PATENTS

| | | | |
|---|---|---|---|
| 2,351,014 | 6/1944 | Connery | 178—53 |
| 2,880,316 | 3/1959 | Wozencraft | 329—105 |
| 2,949,503 | 8/1960 | Andrews et al. | 179—15 |
| 3,057,962 | 10/1962 | Manne et al. | 179—15 |

DAVID G. REDINBAUGH, *Primary Examiner.*

R. L. GRIFFIN, *Assistant Examiner.*